United States Patent [19]

Ueda

[11] Patent Number: 4,912,930
[45] Date of Patent: Apr. 3, 1990

[54] HIGH PERFORMANCE EXHAUST SYSTEM FOR INTERNAL COMBUSTION ENGINE

[75] Inventor: Hideaki Ueda, Iwata, Japan

[73] Assignee: Yamaha Hatsudoki Kabushiki Kaisha, Iwata, Japan

[21] Appl. No.: 285,318

[22] Filed: Dec. 12, 1988

Related U.S. Application Data

[63] Continuation of Ser. No. 935,342, Nov. 26, 1986, abandoned.

[30] Foreign Application Priority Data

Nov. 26, 1985 [JP] Japan .................. 60-263753

[51] Int. Cl.⁴ .............................................. F02B 27/02
[52] U.S. Cl. ........................................ 60/313; 60/314; 60/324
[58] Field of Search ................. 60/312, 313, 314, 324

[56] References Cited

U.S. PATENT DOCUMENTS

| | | |
|---|---|---|
| 933,906 | 9/1909 | Illy . |
| 1,411,226 | 3/1922 | Stumpf . |
| 2,230,740 | 2/1941 | Birkigt . |
| 2,239,262 | 4/1941 | Violet . |
| 2,305,946 | 12/1942 | Wilson et al. . |
| 2,627,851 | 2/1953 | Cushman . |
| 2,644,436 | 7/1953 | Berlyn . |
| 2,686,398 | 8/1954 | Anderson . |
| 2,717,583 | 9/1955 | Maybach ............... 60/313 |
| 3,523,418 | 8/1970 | Marsee . |
| 3,703,937 | 11/1972 | Tenney ............... 60/314 |
| 3,751,921 | 8/1973 | Blomberg et al. . |
| 3,817,227 | 6/1974 | Onishi . |
| 3,938,330 | 2/1976 | Nakajima et al. . |
| 3,969,895 | 7/1976 | Krizman . |
| 4,051,821 | 10/1977 | Amann . |
| 4,226,298 | 10/1980 | Bancel ............... 60/314 |
| 4,254,752 | 3/1981 | Friddell et al. . |
| 4,522,029 | 6/1985 | Tomita et al. . |
| 4,539,813 | 9/1985 | Tomita et al. . |
| 4,545,200 | 10/1985 | Oike et al. . |
| 4,554,785 | 11/1985 | Oike . |
| 4,558,566 | 12/1985 | Shirakura . |

FOREIGN PATENT DOCUMENTS

| | | | |
|---|---|---|---|
| 2567194 | 1/1986 | France ............... | 60/314 |
| 51-54118 | 5/1976 | Japan . | |
| 32920 | 2/1985 | Japan ............... | 60/313 |
| 231156 | 9/1926 | United Kingdom . | |
| 262044 | 2/1928 | United Kingdom . | |
| 519806 | 4/1940 | United Kingdom . | |
| 542429 | 1/1942 | United Kingdom . | |
| 561932 | 6/1944 | United Kingdom . | |
| 572724 | 10/1945 | United Kingdom . | |

Primary Examiner—Douglas Hart
Attorney, Agent, or Firm—Ernest A. Beutler

[57] ABSTRACT

A high output, multiple cylinder internal combustion engine embodying an improved exhaust system. Each cylinder of the engine discharges into a common expansion chamber through a respective exhaust pipe. Valves are provided for preventing the transmission of exhaust pressure pulses back to the combustion chamber exhaust ports.

5 Claims, 4 Drawing Sheets

Figure 3
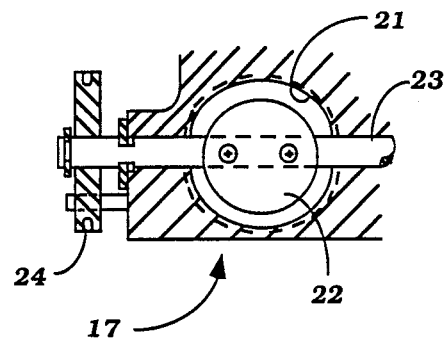
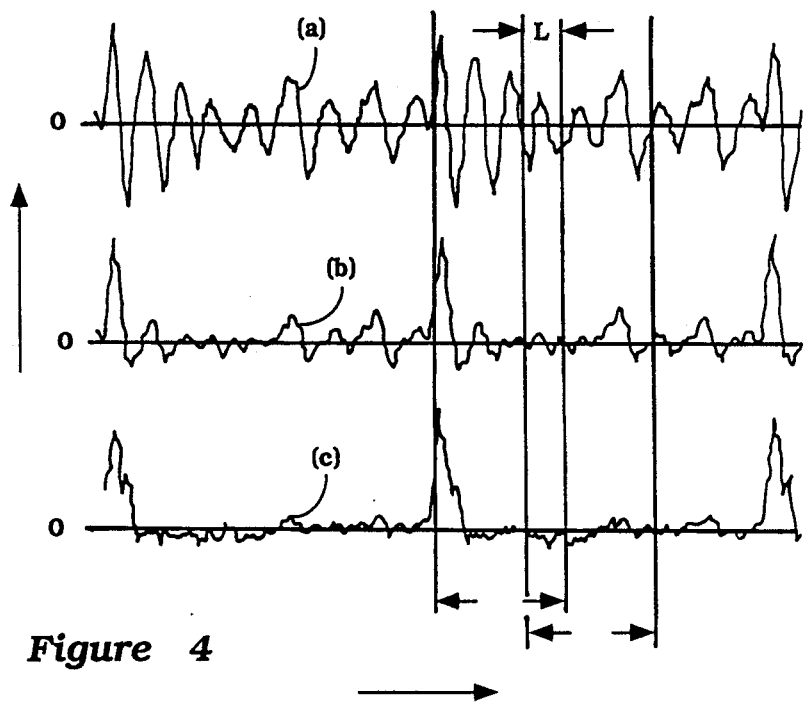
Figure 4

1/2

HIGH PERFORMANCE EXHAUST SYSTEM FOR INTERNAL COMBUSTION ENGINE

This is a continuation application Ser. No.935,342, filed Nov. 26, 1986 now abandoned.

BACKGROUND OF THE INVENTION

This invention relates to a high performance exhaust system for a multi-cylinder internal combustion engine and more particularly to an exhaust system that permits a higher specific output and also which improves the output of the engine at mid-range and idle running conditions.

It is well known that the power output of an internal combustion engine, at any particular running condition, is determined by the amount of fuel/air charge that can be successfully inducted into the combustion chamber and completely burned during each cycle of the engine operation. Thus, the efficiency of the engine is directly related to its charging efficiency. A wide variety of devices have been employed for improving the charging efficiency of an internal combustion engine. Such devices include multiple intake and exhaust valves, turbo-charging, and/or the use of considerable overlap between the opening of the intake valve and the closing of the exhaust valve. High performance engines normally include either valve or port timing (depending on whether they are four or two-cycle type) that have considerable overlap to achieve high power output.

Although such overlapping valve or port timing is very effective to improve the high performance output of an internal combustion engine, such an arrangement for increasing the power output significantly reduces the performance at mid-range conditions, particularly when several cylinders of the engine discharge into a common exhaust device such as an expansion chamber. The reason for this is that there will exist at the exhaust port of the engine a high pressure during a stage of the engine operation when the intake valve is also opened. This high pressure may be caused from the transmission back to the exhaust port of a pressure pulse in the exhaust system. Such pressure pulses may be transmitted from other exhaust ports back through the expansion chamber. Therefore, rather than drawing a fresh fuel/air charge into the combustion chamber through the intake port, the exhaust gases tend to flow back into the combustion chamber through the exhaust port. This not only dilutes the fresh fuel/air charge in the combustion chamber but it also precludes the introduction of a complete fuel/air charge. As a result, many high performance, multiple cylinder engines employing large degrees of valve overlap have extremely poor mid-range or low speed running characteristics. This manifests itself in the torque curve of the engine wherein, although maximum power output is achieved, the torque output of the engine at mid-range and low speeds is considerably poorer than a more convention engine having less valve overlap or port timing overlap.

It is, therefore, a principal object of this invention to provide an arrangement for a multi-cylinder internal combustion engine that will permit the achievement of high power outputs but which will not adversely affect idle and mid-range running.

It is a further object of this invention to provide an arrangement for a multi-cylinder internal combustion engine wherein the power output of the engine may be improved at all running conditions.

It is a still further object of this invention to provide an exhaust system for a multi-cylinder internal combustion engine that permits the use of large valve or port timing overlap without adversely affecting the performance of the engine at low and mid-ranges.

SUMMARY OF THE INVENTION

This invention is adapted to be embodied in an internal combustion engine that has a plurality of combustion chambers, each of which has an exhaust port for discharging exhaust gases from the combustion chamber. Exhaust pipes extend from each exhaust port for conveying exhaust gases therefrom. An expansion chamber is included into at least two of the exhaust pipes discharge. In accordance with the invention, reflective means are positioned contiguous to the end of each exhaust pipe for providing a variable reflection area upon which the exhaust gases in the exhaust pipe may reflect for reducing the pressure at the exhaust port. Means adjust the reflective means effective area in response to an engine condition.

BRIEF DESCRIPTION OF THE DRAWINGS

FIG. 3 is an enlarged cross-section view taken along the line 3—3 of FIG. 2.

FIG. 4 is a family of curves showing the pressure at the exhaust port in connection with different constructions.

DETAILED DESCRIPTION OF THE PREFERRED EMBODIMENTS

Figure 1:
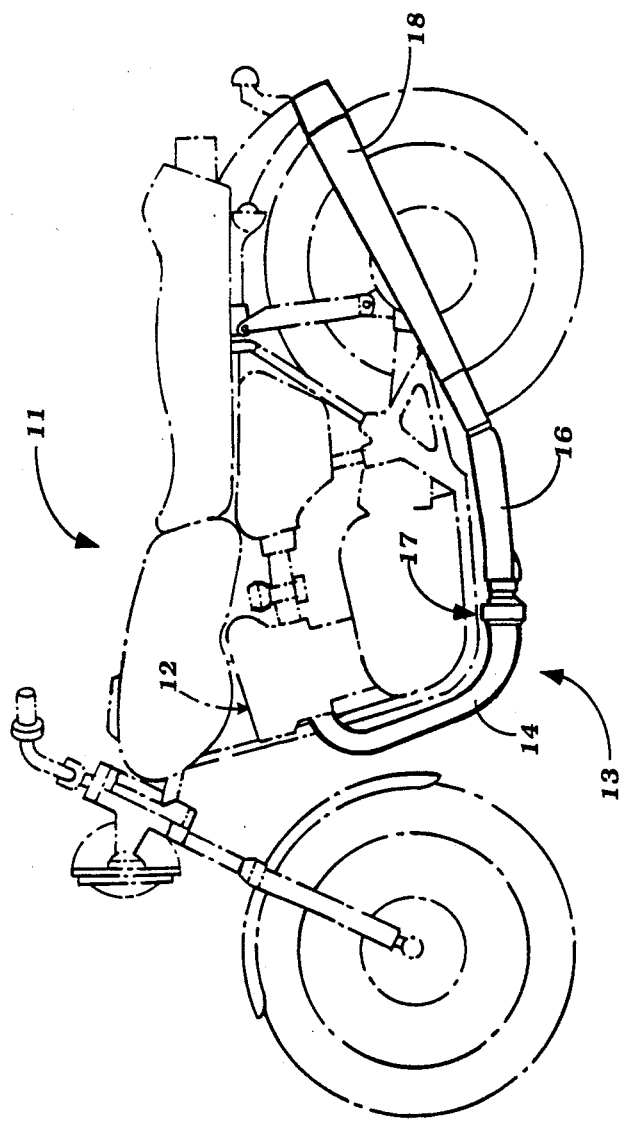
FIG. 1 is a side elevational view of a motorcycle, shown partially in phantom, having an internal combustion engine constructed in accordance with an embodiment of the invention.
Figure 2:
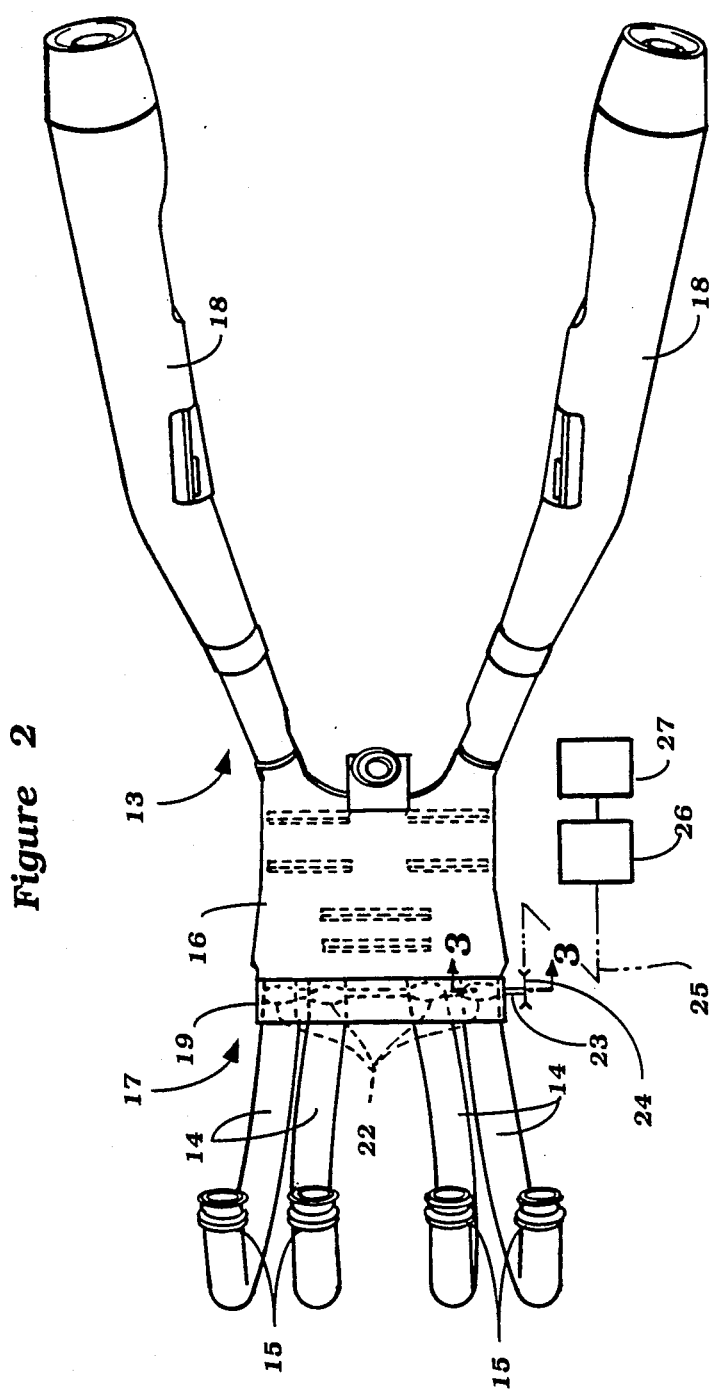
FIG. 2 is an enlarged top plan view showing the exhaust system for the engine.

Referring now in detail to the drawings and particularly to FIGS. 1 and 2, a motorcycle powered by an internal combustion engine constructed in accordance with an embodiment of the invention is shown partially in phantom and is identified generally by the reference numeral 11. The motorcycle 11 includes a powering internal combustion engine 12 which, in the illustrated embodiment, is depicted as being of the four cylinder, inline type. The engine 12, in the illustrated embodiment, is of the four-cycle type, however, it is to be understood that the invention may be practiced with engines operating on the two-stroke cycle, and on engines having differing numbers of cylinders and different cylinder arrangements. Also, the invention is susceptible of use in other than reciprocating engines. However, the invention has utility in multi-cylinder engines of the type wherein there is a substantial overlap between the closing of the exhaust valve and the opening of the intake valve or, in the case of a two-cycle engine, the closing of the exhaust port and the opening of the intake port.

Since the invention deals with the exhaust system for the engine, the details of the engine have not been illustrated. It is to be understood, however, that the engine has an intake port and an exhaust port which are controlled either by valves, piston movement or the like, depending upon whether the engine is of the two or four-cycle type and that there is a substantial overlap between the opening of the intake valve and the closing of the exhaust valve as will be described.

The engine 12 is provided with an exhaust system, indicated generally by the reference numeral 13, and which is constructed in accordance with an embodiment of the invention. The exhaust system 13 includes a plurality of individual exhaust pipes 14 that are flanged as at 15 at their inlet ends for cooperation with the cylinder head of the engine 12 so as to place the exhaust pipes 14 in communication at their inlet ends with the exhaust ports of the engine 12. At their outlet ends, the exhaust pipes 14 discharge into an expansion chamber 16 through a valve assembly, indicated generally by the refernce numeral 17 and constructed in accordance with an embodiment of the invention. The exhaust gases are delivered from the expansion chamber 16 to the atmosphere through a pair of combined muffler and tailpipes 18 which lie on opposite sides of the rear wheel of the motorcycle.

Except for the valve mechanism 17 and the way it is operated, which will be described, the engine 12 and its exhaust system 13 may be considered to be conventional. The engine 12 is designed to be of the high output type and has a substantial overlap in its valve timing. As a result, the engine 12, with its exhaust system 13 and without considering the operation of the valve mechanism 17, will produce a torque curve at high speeds that is extremely good and provides a high power. However, at the intermediate ranges, the torque curve falls off rather badly and these are the normal cruising speeds of the engine. Also, at the idle condition and low speed, the torque is also not good and poor running results.

This poor low and mid-range torque curve is a result of the fact that pressure pulses occur at the exhaust ports during the overlap period which pressure pulses tend to cause exhaust gases to flow back into the combustion chamber. As a result, the combustion chamber is not filled with a fresh fuel/air charge and these poor performance characteristics result. At high engine speeds, the positive pressure pulses do not occur at the exhaust port during the overlap and hence this phenomenon occurs at other than high speed conditions. The reason for this may be seen by looking at the top curve of FIG. 4 wherein the pressure at the exhaust port of an engine operating at a low speed condition is identified by the curve a. During the period of valve overlap L, there is a positive pressure at the exhaust ports of the cylinders, which positive pressure occurs at least in part due to the transmission of pressure pulses from other exhaust ports back to any one exhaust port through the expansion chamber 16. Hence, this positive pressure causes the deleterious effects as aforenoted.

In accordance with the invention, the valve mechanism 17 is employed for preventing the existence of such positive pressures at the exhaust port during the overlap period and under predetermined running conditions.

Referring now specifically to FIGS. 2 an 3, the valve assembly 17 includes a valve body 19 that has a plurality of passages 21 that cooperate with the exhaust pipe outlets 14 to deliver exhaust gases into the expansion chamber 16. In each of the passages 21, there is provided a control valve 22 for controlling the pressure at the exhaust ports of the engine.

The control valves 22 are all affixed to a common control valve shaft 23 that is journaled in a suitable manner in the valve body 19. At one end of the shaft 23, there is provided a control pulley 24 around which is wound a flexible transmitter 25. The transmitter 25 is, in turn, operated by means of a control motor 26 that may be of any known type motor such as a vacuum motor, electric motor, electric solenoid or the like. The control motor 26 is, in turn, operated by means of a logic device 27 that controls the position of the valves 22 in response to preset conditions. These preset conditions may be either engine speed, carburetor throttle valve position, boost pressure (in the event the engine is supercharged), engine load, or any other type of arrangement for providing the necessary control signal in response to the running condition.

In a preferred embodiment of the invention, the cross-sectonal area of the reflective control valve 22 is such that when they are fully closed, as shown in FIG. 3, that they will obstruct an area of the effective cross-sectional area of the exhaust pipes 14. The effective cross-sectional area which is obstructed when the valves 22 are closed can be varied to change running conditions. FIG. 4 shows two additional curves, one (curve b) in which the valve 22 closes approximately 50% of the effective cross-sectional area while the other, curve c, shows an arrangement wherein the valve 22 closes 90% of the effective area. These areas are generated at idle conditions which is approximately equal to 1,200 rpm in an embodiment of the invention. As can be seen, the greater the effective closing, the less the pressure peaks which occur during the overlap period L. Of course, those skilled in the art can determine the appropriate size of the restriction so as to suit particular running conditions.

Figure 5:
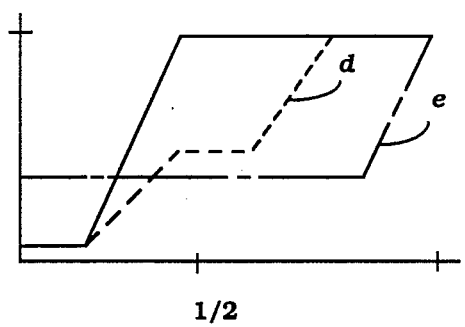
FIG. 5 is a graphical view showing how the reflective control valves may be operated.

FIG. 5 is a view that shows how the valves 22 are closed in response to an engine running condition. In the illustrated embodiment, the arrangement is such that the control valves 22 are closed in response to the speed of the engine. Of course, as has been previously noted, other types of controls can be employed. In the solid line view shown in this figure, the valves 22 are held closed from an idle position up to a low speed condition and then are opened progressively until they reach fully opened position at approximately half engine speed. However, it is to be understood that differing opening arrangements may be employed as shown by the dotted line curve d or the dot-dash curve e. Those skilled in the art can readily determine which type of arrangement best suits a given engine performance bearing in mind the number of cylinders, firing order, and so forth. However, in each instance, the arrangement is such that the torque of the engine can be significantly improved at low speed running.

It should be readily apparent from the foregoing description that an improved exhaust system has been provided for an internal combustion engine wherein the engine power output may be improved throughout the entire load and speed ranges without making any sacrifices or compromises. Although the invention has been illustrated in connection with a specific embodiment of the invention, as already noted, various changes and modifications may be made without departing from the spirit and scope of the invention, as defined by the appended claims.

I claim:

1. In an internal combustion engine having a plurality of combustion chambers, an exhaust port for each of said combustion chambers for discharging exhaust gases from said combustion chambers, a plurality of exhaust pipes each extending from a respective inlet end at a respective one of said exhaust ports for conveying exhaust gases therefrom to a respective outlet end, and an expansion chamber into which said exhaust pipe outlet ends discharge, the improvement comprising valve means adjustably positioned directly at said exhaust pipe outlet ends for restricting the transmission of exhaust pulses from said expansion chamber back to said exhaust ports through the full length of said exhaust pipes, and means for adjusting the position of said valve means in response to an engine condition.

2. In an internal combustion engine as set forth in claim 1 wherein the valve means comprises a valve cooperating with each exhaust pipe.

3. In an internal combustion engine as set forth in claim 1 wherein the engine condition comprises engine speed.

4. In an internal combustion engine as set forth in claim 3 wherein the valve means is closed when the engine speed is below a predetermined speed.

5. In an internal combustion engine as set forth in claim 4 wherein the valve means comprises a valve cooperating with each exhaust pipe.

* * * * *